US006208842B1

United States Patent
Henderson et al.

(10) Patent No.: US 6,208,842 B1
(45) Date of Patent: Mar. 27, 2001

(54) METHOD AND APPARATUS FOR ESTIMATING A CHANNEL PARAMETER

(75) Inventors: Stephen W. Henderson, Chicago; Jeff L. Pfeil, Bartlett; Javier J. Tapia, Wheaton, all of IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/409,213

(22) Filed: Sep. 30, 1999

(51) Int. Cl.$^7$ ................................................. H04B 17/00
(52) U.S. Cl. .......................... 455/67.1; 455/62; 455/303; 375/344
(58) Field of Search ........................... 455/62, 67.1, 67.3, 455/423, 424, 226.1, 226.3, 303–305; 375/148, 150, 349, 350, 344; 370/335, 342

(56) References Cited

U.S. PATENT DOCUMENTS

| | | | |
|---|---|---|---|
| 5,515,300 | * | 5/1996 | Pierce ..................................... 702/190 |
| 5,594,754 | * | 1/1997 | Dohi et al. ......................... 375/344 X |
| 5,621,752 | * | 4/1997 | Antonio et al. ...................... 375/144 |
| 5,629,929 | * | 5/1997 | Blanchard et al. ................... 370/201 |
| 5,654,979 | * | 8/1997 | Levin et al. ........................... 375/142 |
| 5,918,161 | * | 6/1999 | Kumar et al. ............................ 455/65 |
| 5,953,326 | * | 9/1999 | Nakamura et al. ................... 370/335 |
| 6,067,315 | * | 5/2000 | Sandin .................................. 375/150 |
| 6,075,807 | * | 6/2000 | Warren et al. ........................ 375/143 |
| 6,085,077 | * | 7/2000 | Fields et al. .......................... 455/303 |

* cited by examiner

Primary Examiner—William G. Trost
(74) Attorney, Agent, or Firm—Kenneth A. Haas

(57) ABSTRACT

A method and apparatus for estimating mobile radio channel parameters by dynamically determining the delay offset, carrier frequency offset, and coherent averaging length that yields the optimum despreading gain for current channel conditions. Obtaining the optimal despreading gain increases the fidelity of desired channel parameter estimates, (such as delay, phase, and the complex impulse response), and also expands the range of conditions under which they can be feasibly measured. A plurality of delay offsets, carrier frequency offsets, and coherent averaging lengths are considered for each measurement of channel parameters. An energy metric assigned to each combination of delay offset and coherent averaging length, and this value measures the despreading gain for these conditions.

26 Claims, 8 Drawing Sheets

METHOD AND APPARATUS FOR ESTIMATING A CHANNEL PARAMETER

FIELD OF THE INVENTION

The present invention relates generally to communication systems and, in particular, to a method and apparatus for estimating one or more radio channel parameters within a mobile communication system.

BACKGROUND OF THE INVENTION

Radio location techniques are widely used in many mobile transmitter systems. Among these location techniques are a) Time of Arrival (TOA), b) Time Difference of Arrival (TDOA), and c) Angle of Arrival (AOA) methods. Each of these techniques requires either the measurement or estimation of one or more parameters of the communication channel utilized by the mobile transmitter.

To estimate the location of a mobile transmitter in a code division multiple access (CDMA) communication system, estimates of channel parameters such as delay, amplitude, and possibly phase must be obtained for multiple signals. In general, these parameter estimates will be obtained by correlating received signals with one or more "perfect" reference signals.

Correlation with a reference waveform can also be interpreted as despreading followed by coherent averaging. Up to a point, the longer the correlation (coherent averaging length), the more despreading gain is obtained. Effects from noise and interference on these channel estimates, which are normally severe, can be made arbitrarily small so long as the despreading gain can be increased. In practice, the maximum despreading gain is limited by the non-stationarity of the communication channel. If the communication channel lacks sufficient stationarity, a longer averaging window will ultimately result in a decrease in despreading gain below the maximum achievable level. Thus, it is desirable to determine the optimal coherent averaging length and the corresponding maximum despreading gain for the radio channel conditions achievable at any given observation.

Higher gain is advantageous particularly in mobile transmitter location applications. This is because it may be necessary for an adjacent sector or remote sector to detect the mobile transmitter to accurately fix its position. In a communication system, such as a CDMA communication system where the mobile transmitter is power controlled, when the mobile transmitter is located near to a serving sector, it may communicate with relatively low power. As a result, detection of the mobile transmitter's signal at adjacent or remote sectors is difficult. Where detection is required, such as when determining the mobile transmitter's location, it has been proposed to have the mobile transmitter "power-up" to a level sufficient to permit detection at the adjacent or remote serving sector. Such a strategy, however, defeats the benefits of providing power control.

Therefore, a need exists for a method and apparatus for channel parameter estimation having high gain under various communication channel conditions.

DETAILED DESCRIPTION OF THE PREFERRED EMBODIMENTS

To address the above-mentioned need, a method and apparatus for estimating an energy metric is provided herein. In the preferred embodiment, the invention searches through a plurality of delay offsets, carrier frequency offsets, and coherent averaging lengths so as to maximize this metric. Finding the peak value for the energy metric in turn determines the delay offset, carrier frequency offset, and coherent averaging length that yield maximum possible despreading gain for each measurement of channel parameters.

Figure 1:
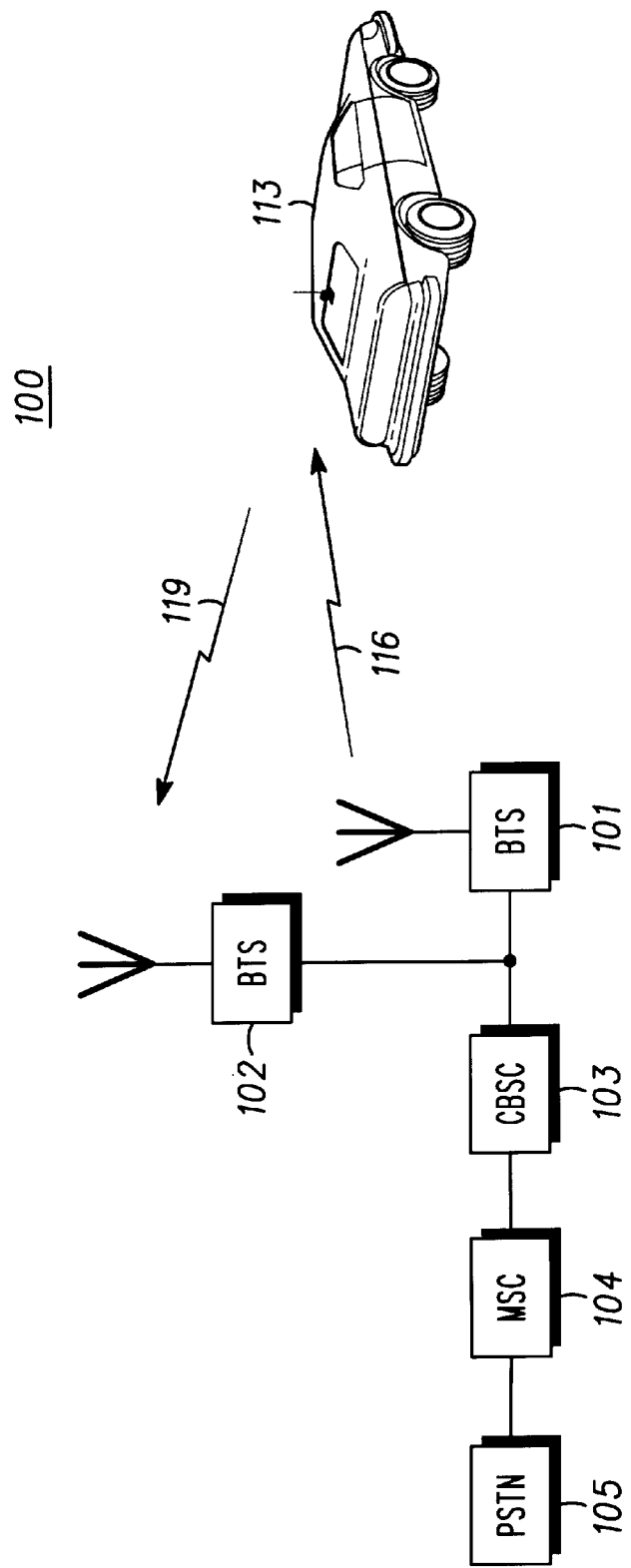
FIG. 1 is a block diagram of a communication system in accordance with the preferred embodiments of the present invention.

With reference now to the drawings wherein like reference numeral are utilized to designate like elements throughout, FIG. 1 is a block diagram of a communication system 100 in accordance with a preferred embodiment of the present invention. In the preferred embodiment, the communication system 100 utilizes a code division multiple access (CDMA) system protocol as described in Cellular System Remote unit-Base Station Compatibility Standard of the Electronics Industry Association/Telecommunications Industry Association Interim Standard 95C (IS-95). (EIA/TIA can be contacted at 2001 Pennsylvania Ave. NW, Washington, D.C. 20006). However, in alternate embodiments, the communication system 100 may utilize other digital cellular communication system protocols such as, but not limited to, the next generation CDMA architecture as described in the UMTS Wideband CDMA SMG2 UMTS Physical Layer Expert Group Tdoc SMG2 UMTS-L1 221/98 (UMTS 221/98), the next generation CDMA architecture as described in the CDMA2000 International Telecommunications Union-Radiocommunication (ITU-R) Radio Transmission Technology (RTT) Candidate Submission document, or the next generation Global System for Mobile Communications (GSM) protocol, the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008), or the European Telecommunications Standards Institute (ETSI) Wideband CDMA (W-CDMA) protocol.

The communication system 100 includes a number of network elements such as a base station 101, a Centralized Base Station Controller (CBSC) 103, and a Mobile Switching Center (MSC) 104. Suitable network elements are commercially available from Motorola, Inc. (Motorola, Inc. is located at 1301 East Algonquin Road, Schaumburg, Ill. 60196). A remote unit 113 is configured to operate within the system 100. It is contemplated that the network elements within the communication system 100 are configured in well known manners with processors, memories, instruction sets, and the like, which function in any suitable manner to perform the functions set forth herein.

As shown, the remote unit 113 is communicating with the base station 101 and the base station 102 via uplink communication signals 119. The base station 101 is communicating with the remote unit 113 via downlink communication signals 116. In the preferred embodiment of the invention, base station 101 is suitably coupled to CBSC 103, and CBSC 103 is suitably coupled to MSC 104, which in turn is coupled to a public switched telephone network (PSTN) 105.

Figure 2:
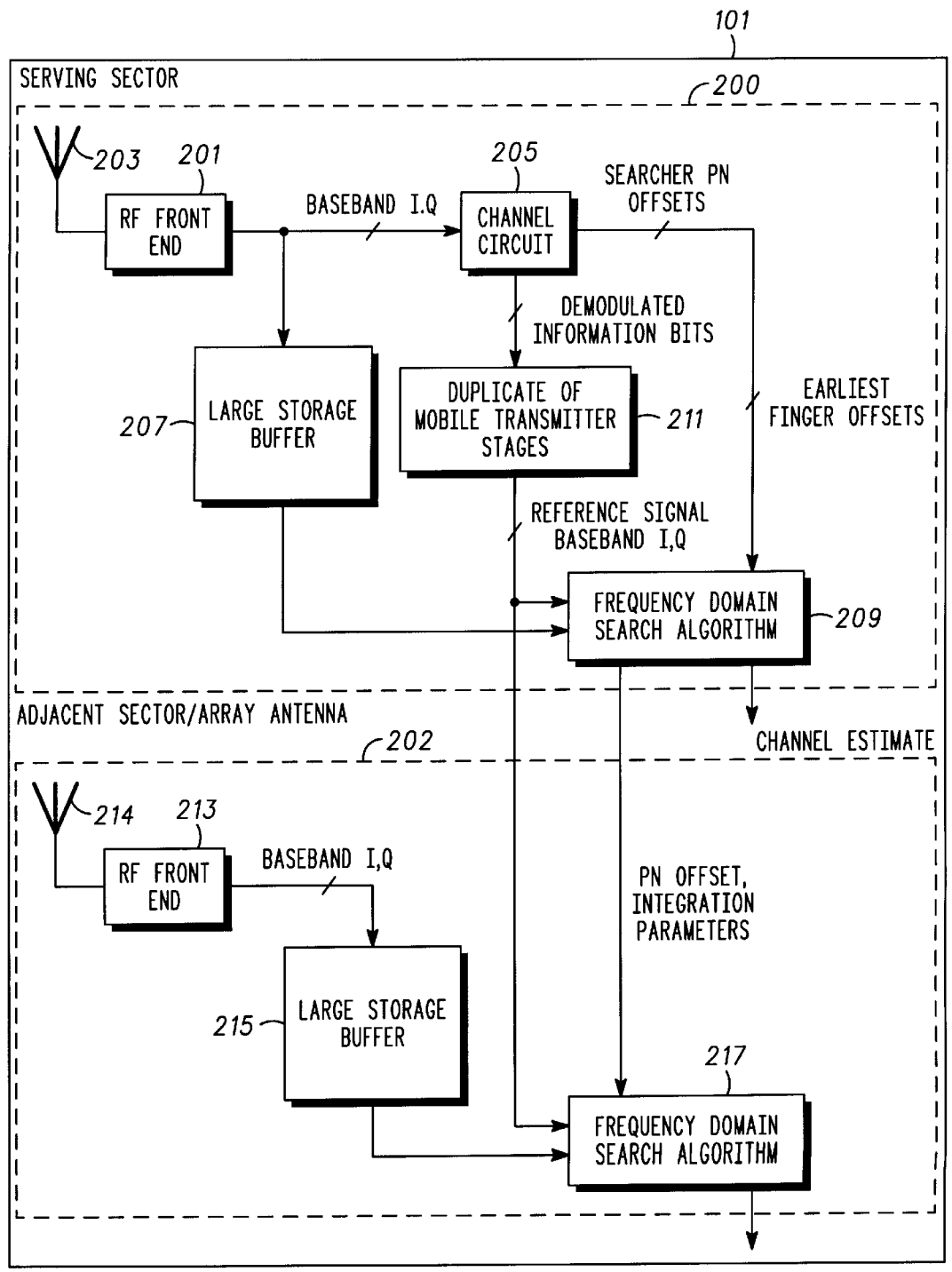
FIG. 2 is a block diagram of a first base station of the communication system depicted in FIG. 1 and in accordance with the preferred embodiments of the present invention.

Referring now to FIG. 2, the base station 101 is configured as is well known to provide communications services to a plurality (typically three or six) communication sectors surrounding the base station 101. For a first or serving sector 200, the base station 101 has a common radio frequency (RF) front end 201 coupled to the receiver antenna array 203. The RF front end 201 feeds baseband I, Q signals to the CDMA channel circuitry 205 and to a large storage buffer 207. The CDMA channel circuitry 205 preferably provides for locking to at least three different received rays at least one PN chip time apart, and as such, is typical of most rake receivers utilized in CDMA systems. The CDMA channel circuitry 205 feeds the earliest PN offsets to a frequency domain searcher 209. The channel circuitry 205 further feeds demodulated information bits to a duplicate mobile transmitter stage 211, which re-modulates the information bits providing reference baseband I, Q signals to the searcher 209. The searcher 209 further receives as an input the stored baseband I, Q signals from the storage buffer 207. The searcher 209, as will be described, provides channel parameter estimates.

Still referring to FIG. 2, a second or adjacent sector 202 of the base station 101 is similarly configured with an RF front end 213 coupled to an antenna array 214, a large storage buffer 215, a frequency domain searcher 217, CDMA channel circuitry (not depicted) and a duplicate mobile transmitter stage (not depicted). The searcher 217 is further fed PN offset integration parameters from the searcher 209 in the serving sector 200. It should be appreciated that reference to serving sector and adjacent sector is for the purpose of clarifying the functions performed within the base station 101, and that the adjacent sector may act as a serving sector and vice versa without departing from the principles of the invention.

Figure 3:
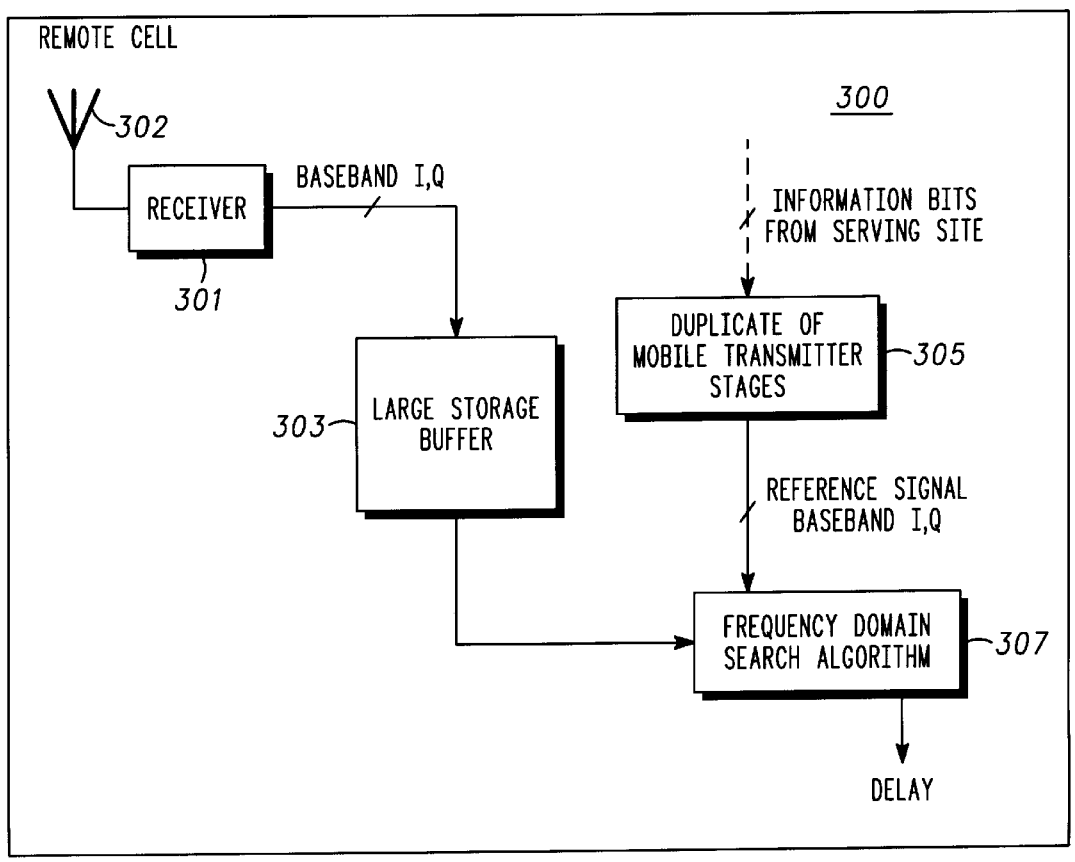
FIG. 3 is a block diagram of a second base station of the communication system depicted in FIG. 1 and in accordance with the preferred embodiments of the present invention.

Turning now to FIG. 3, base station 102 is configured in a manner similar to the base station 101 serving a plurality of sectors. A single sector 300 is depicted and includes a RF front end 301 coupled to an antenna array 302, a large storage buffer 303, a duplicate mobile transmitter stage 305, a frequency domain searcher 307 and CDMA channel circuitry (not depicted). Via suitable network span, the information bits from the CDMA channel circuitry 205 are fed to the duplicate mobile transmitter stage 305 along with time reference information. The duplicate mobile transmitter stage 305 re-modulates the information bits to provide reference baseband I, Q signals to the searcher 307. The buffer 303 feeds stored baseband I, Q signals received from the remote unit 113 and for the same epoch of time corresponding to the reference baseband I, Q signals generated from the information bits.

One application of the present invention is for location determination of the remote unit 113 operating within the communication system 100. It will be appreciated that the remote unit 113 may also be adapted to use the principles of the invention to determine its own location within the communication system 100. To estimate the location of the remote unit 113, estimates of channel parameters, such as delay, amplitude and phase must be obtained for multiple signals. As will be described, the searchers 209, 213 and 307 are adapted to provide such estimates.

With reference once again to FIGS. 2 and 3, discrete time sampled baseband I, Q representations are stored within the buffers 207, 215 and 307. The samples are collected in such a way that the precise instant that they were captured is known unambiguously in terms of the system time reference. Each buffer 207, 215 and 307 is large, storing as much as a half-second or more of the received waveform, and may store between about 0.1 to about 2.0 seconds of the received waveform. However, one will appreciate that the invention has application where the signal sample is of substantially shorter or substantially longer duration than the aforementioned range. Data collection at the serving sector 200, adjacent sector 202 and remote sector 300 is synchronized so that the same time-span is represented in all of the buffers 207, 215 and 307 at any instant.

While the samples are captured, they are also forwarded to the CDMA channel circuitry 205 at the serving sector 200. The CDMA channel circuitry 205 demodulates the baseband I, Q signals of interest and produces the information bits and corresponding time information. The information bits are collected and stored in memory within the base station 101. The channel circuitry 205 may also provide its own searcher results that may be utilized to provide a search seed and/or to narrow the search window as described below. Techniques for narrowing the search window are described in the commonly assigned U.S. patent application entitled "METHOD AND APPARATUS FOR LOCATING A REMOTE UNIT WITHIN A COMMUNICATION SYSTEM", filed of even date herewith application Ser. No. 09/409,552 filed Sep. 30, 1999 the disclosure of which is hereby expressly incorporated herein by reference. Moreover, if a reverse-link pilot signal is available, then the described demodulation stage is not necessary.

Departing briefly from the foregoing discussion, as mentioned, the invention also has application to the case of a remote unit determining its location (i.e., location based on forward link signals). In such an application, pilot signals may be assumed to be available for the forward link signals of each of the base stations. Therefore, the demodulation would not be necessary. This configuration would only require the remote unit perform the downconversion, sampling and collection of complex baseband samples in a buffer for subsequent analysis, and remodulation of the known pilot sequence.

Returning now to the discussion in connection with FIGS. 2 and 3, when the buffers 207, 215 and 307 are filled and the corresponding information bits have been completely demodulated (assuming no reverse link pilot), the bits are re-modulated using the duplicate mobile transmitter stage 211 at the serving sector 200 and the duplicate mobile transmitter stage 305 at the remote sector 300 to produce reference baseband I, Q signals. The searchers 209, 213 and 307 process the stored waveforms and the reference waveforms to produce channel parameter estimates, such as signal delay, gain and possibly the complex channel impulse response.

Figure 4:
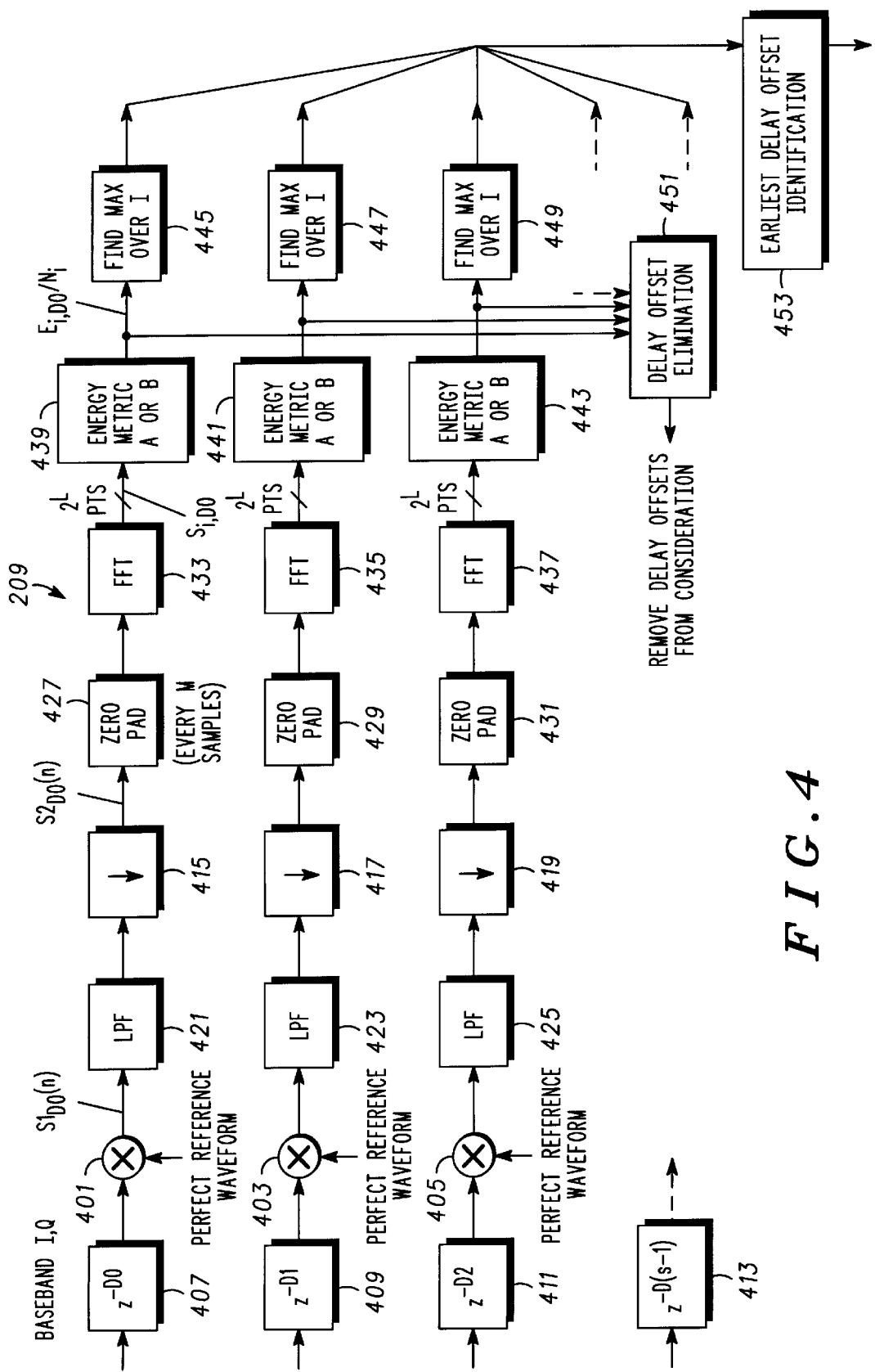
FIG. 4 is a block diagram of a frequency domain searcher in accordance with the preferred embodiments of the present invention.

In the preferred embodiment of the invention, the operation of each of the searchers 209, 213 and 307 is identical and the following description with respect to the searcher 209 is applicable to each. It will be appreciated that the functionality of the searcher 209 may be implemented as software on magnetic or optical media, firmware, a programmable gate array or an application specific integrated circuit without departing from the fair scope of the invention. With reference now to FIG. 4, within the searcher 209 multipliers 401–405 point-by-point multiply the baseband I, Q signal stored within the buffer 207 by the reference baseband I, Q signal over a range of delay offsets 407–413 from D0 to D(S-1), where S is an initial search window length. Each row illustrated in FIG. 4 is representative of one particular delay offset evaluated by the searcher. Generally herein the term sub-group is used to refer to delay offsets; however, a sub-group may be any propagation path delay component, multipath delay component or other sub-portions of the received signal, including overlapping sub-portions, without departing from the invention.

Figure 5:
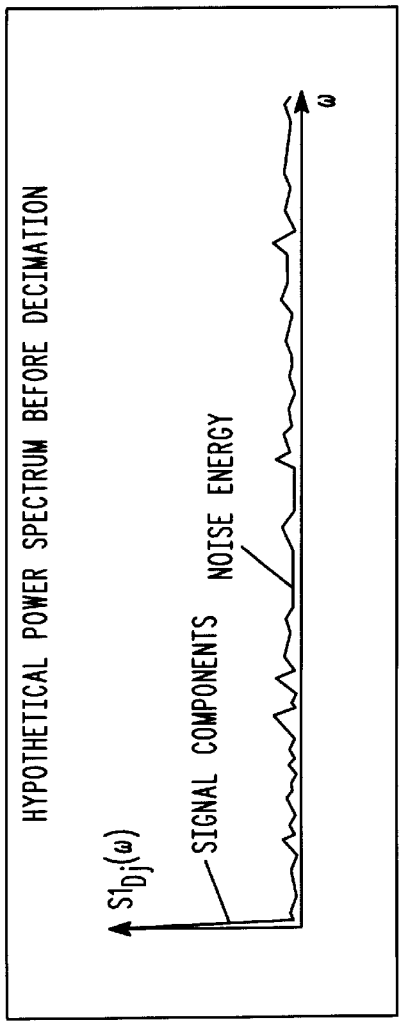
FIG. 5 is a graph illustrating a hypothetical power spectrum before decimation within the frequency domain searcher illustrated in FIG. 4.

The search window length, i.e., the number of sub-groups or delay offsets which require evaluation, may be shortened using searcher results from the channel circuitry 205 and/or using the techniques described in the aforementioned U.S. patent application "METHOD AND APPARATUS FOR LOCATING A REMOTE UNIT WITHIN A COMMUNICATION SYSTEM." The delay shifts may be simply implemented by offsetting a read pointer in the buffer 207. If the candidate PN offset Dj corresponds to an actual signal component, the resulting signal $S1_{Dj(n)}$ should correspond to a highly over sampled low pass waveform with significant additive white noise. A hypothetical one-sided spectrum for $S1_{Dj(n)}$ is depicted in FIG. 5.

Figure 6:
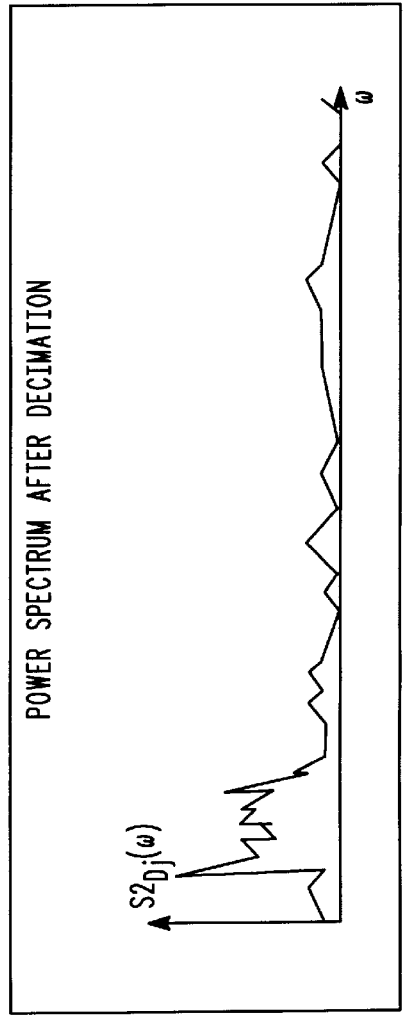
FIG. 6 is a graph illustrating a hypothetical power spectrum after decimation within the frequency domain searcher illustrated in FIG. 4.

Decimators 415–419 decimate the product signals $S1_{Dj(n)}$ by a factor N, and associated low pass anti-aliasing filters 421–425 introduce coherent averaging. The decimation may be completed efficiently (though suboptimally) by simply adding N samples together then skipping N samples. Other efficient decimation schemes are also possible. The sample rate should be decimated so that the component of the signal with the highest carrier frequency offset (including Doppler shift) is represented without frequency aliasing. For example, the maximum allowable carrier frequency offset due to non-ideal characteristics of a remote unit in accordance with the IS-95 protocol is about 300 MHZ. If the carrier is at 1900 MHZ, and the maximum velocity of the remote unit is 155 kilometers per hour (kph), the Doppler shift could be up to 269 Hz. This suggests the Nyquist frequency for decimated sample rate should be above 600 Hz. A hypothetical one-sided spectrum for $S2_{Dj(n)}$ is depicted in FIG. 6.

After every block of M decimated samples are generated, the resulting waveform of total accumulated length iM, where i is an index integer, is zero-padded (FIG. 7) to a length $2^L$ by zero-padding operators 427–431. A $2^L$ point Fast Fourier Transform (FFT) is computed over the zero-padded signal waveform for each offset $D_j$ and each length iM using FFT operators 433–437 to generate an FFT output spectrum. Because the signal is highly decimated, the FFT operators 433–437 should require only moderate amounts of computation and storage. The FFT output $S_{i,Dj}$ for each nonzero input of length iM corresponds to iM-length coherent averaging. Each one of the $2^L$ FFT outputs corresponds to coherent averaging with frequency compensation for one of $2^L$ different possible carrier frequency offsets.

For each FFT output vector $S_{i,Dj}$, a signal to noise energy metric $E_{i,Dj}/N_i$ is computed by operators 439–443. One of two computations may be used by the operators 439–443 as described below.

Figure 8:
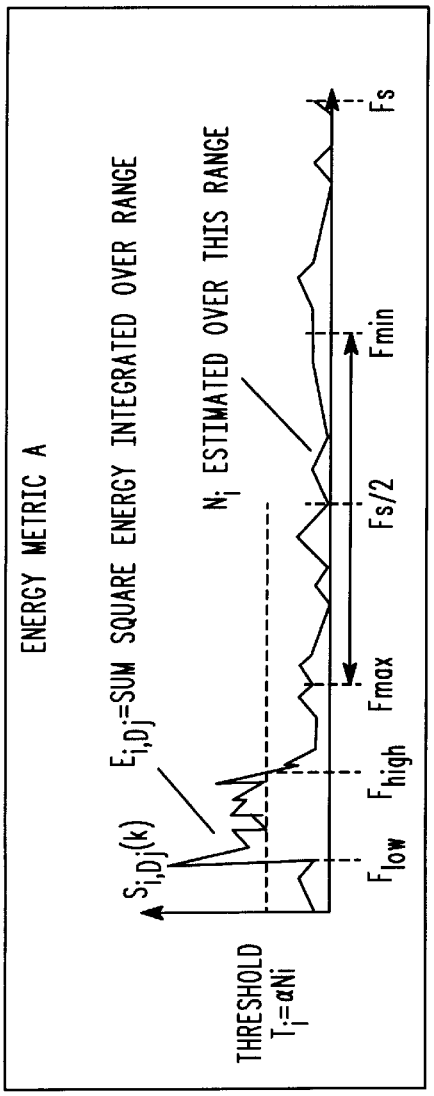
FIG. 8 is a graph illustrating an energy metric calculation in accordance with a preferred embodiment of the invention.

In a first preferred computation, a maximum and minimum frequency ($F_{high}$ and $F_{low}$, respectively) spanning the range of signal spectral components is selected by applying a threshold to the spectrum. Square energy is integrated over this whole span to produce a signal energy metric $E_{i,Dj}$. The concept is illustrated in FIG. 8. The signal component frequency range is determined by finding the maximum and minimum frequency components with energies that clear a threshold, $T_i$. $T_i$ is computed by multiplying the estimated noise energy $N_i$ by a scaling constant α. The computation of $N_i$ is described below. Signal components are only sought over a range below $F_{max}$ and above $F_{min}$, which represents the realistic maximum carrier frequency offsets in positive and negative directions, and thus represents a region of the FFT output spectrum that might contain signal components. For an IS-95 reverse link signal, $F_{max}$ and $F_{min}$ would be set at +/−600 Hz.

Figure 9:
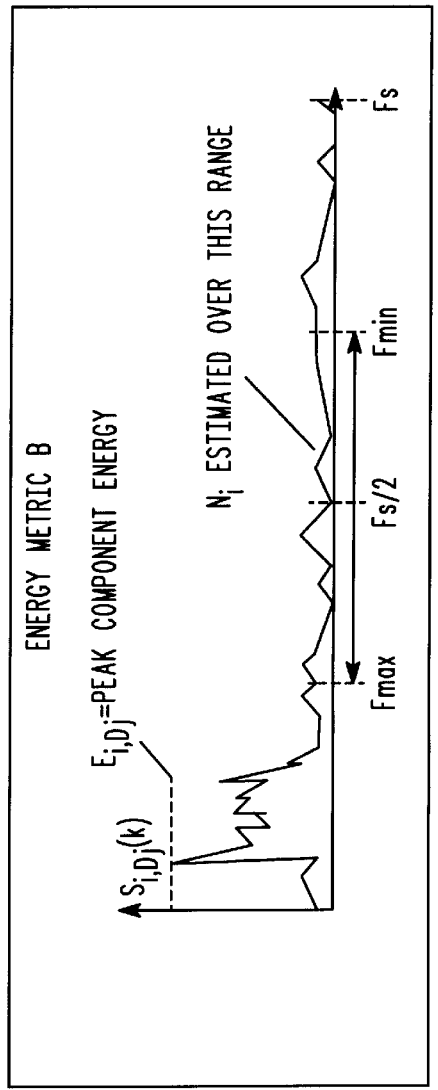
FIG. 9 is a graph illustrating an energy metric calculation in accordance with an alternate preferred embodiment of the invention.

In a second preferred computation, square energy of the peak spectral components is calculated to form an energy measurement. This concept is illustrated in FIG. 9. The peak is only sought for frequencies below $F_{max}$ and above $F_{min}$.

Figures 7, 11:
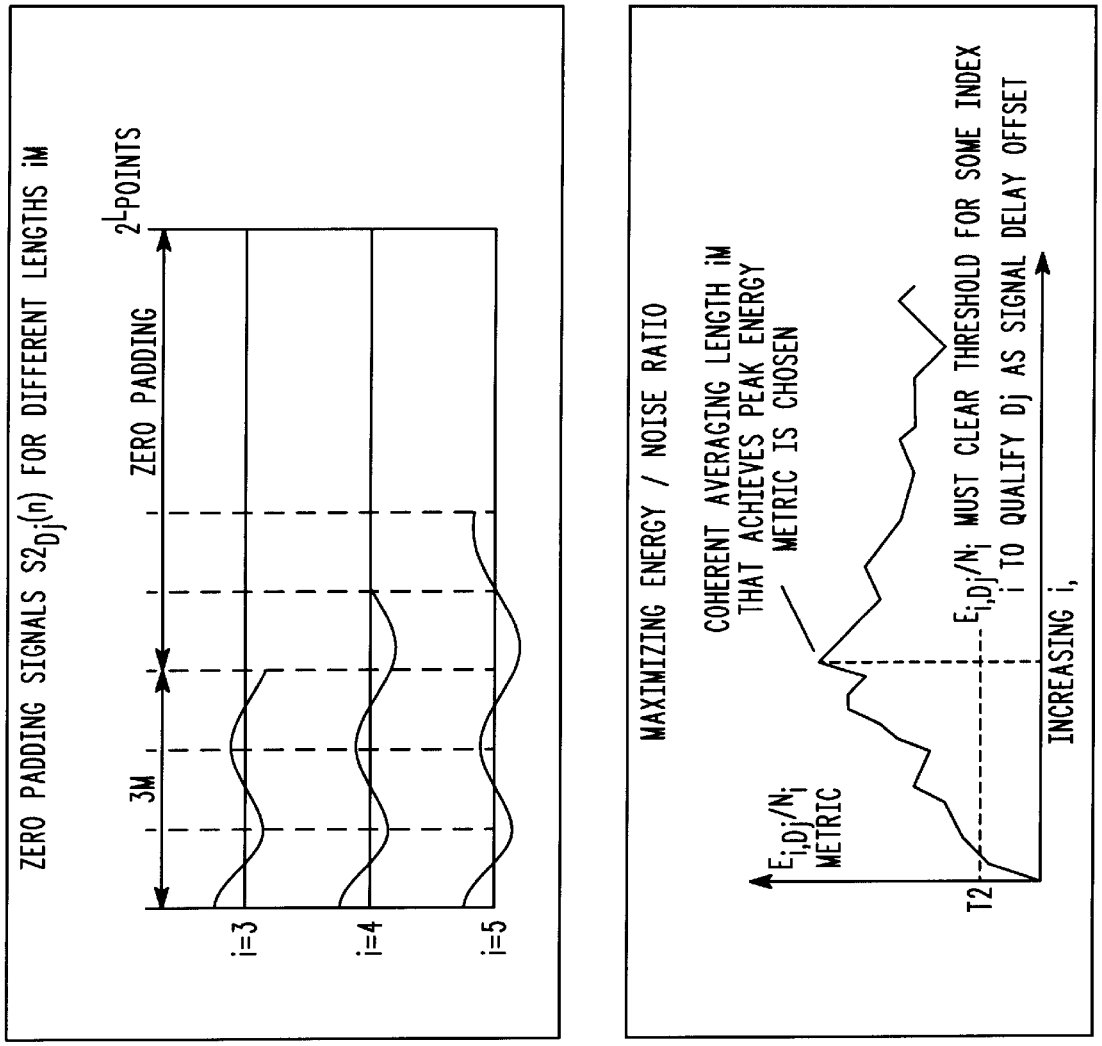
FIG. 7 is graphical representation of zero-padding utilized by the frequency domain searcher illustrated in FIG. 4.
FIG. 11 is a graph illustrating a maximum energy-to-noise ratio calculation in accordance with a preferred embodiment of the present invention.

In each of the preferred computations, the value $N_i$, proportional to the accumulated noise energy is computed for each signal length iM, but only at one delay offset. This offset is arbitrarily chosen to be the one with the smallest delay. The single estimate $N_i$ is used in the ratios $E_{i,Dj}/N_i$ for all delay offsets. $N_i$ is computed by summing the square energy of all frequency components above a maximum possible signal frequency, $F_{max}$ and below a minimum negative frequency offset $F_{min}$, in a region of the FFT output spectrum that does not contain signal components. FIGS. 7 and 8, show $F_{min}$ as it would be located in an FFT output, with negative frequencies covering a range above Fs/2.

Figure 10:
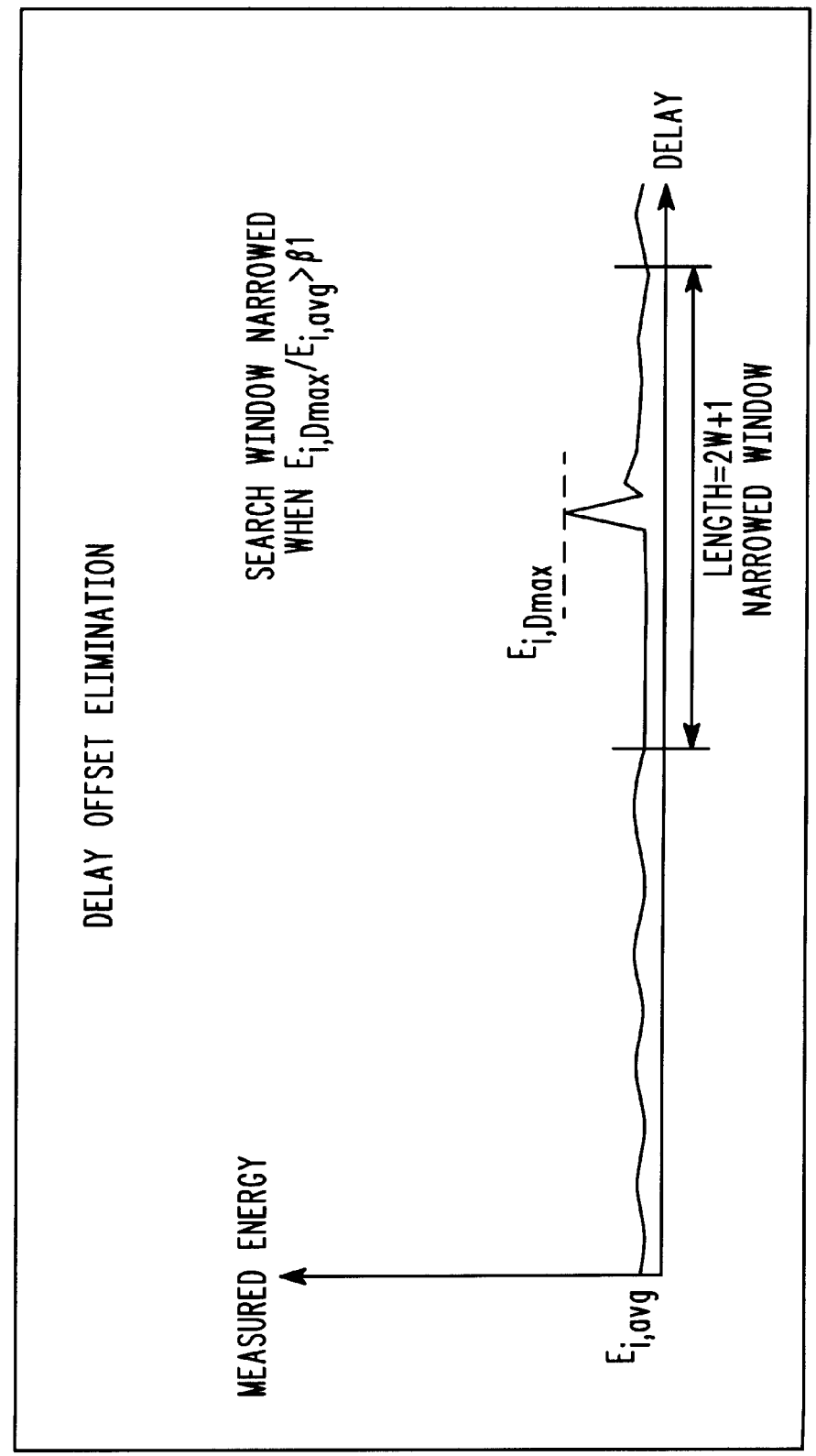
FIG. 10 is a graph illustrating an averaging window in accordance with a preferred embodiment of the invention.

The energy metrics $E_{i,Dj}$ are averaged to produce $E_{i,avg}$ for each index i by operators 445–449. The maximum energy $E_{i,Dmax}$ is determined, and when for some i it exceeds the average energy for all offsets by a factor β, the search window is narrowed to a width 2W+1 (FIG. 10). Operator 451 accomplishes this by excluding all delay offsets $D_j$ from further examination that fall outside the range (Dmax−W, Dmax+W). The value W should be chosen to significantly reduce the total computation required to complete the analysis, but should be wide enough to span the whole channel impulse response. The values $E_{i,Dj}$ and $N_i$ are preferably retained in memory for all surviving offsets for each index i. The despread decimated waveform for all surviving offsets are preferably retained and accumulated until the entire contents of the storage buffer are processed.

After an array of energy to noise ratio metrics ($E_{i,Dj}/N_i$) for surviving offset candidates have been computed by increasing the nonzero lengths iM up to the full length of the storage buffer and using these as inputs to the FFT operators 433–437, the best metric is determined for each offset by maximizing over i. This maximization step is illustrated in FIG. 11. The best metric may then be mapped back to an optimal coherent averaging length, carrier frequency offset and delay offset. Providing at least one metric exceeds a threshold T2, the operator 453 determines the earliest offset with maximum $E_i/N_i$ exceeding the threshold T2. This offset is considered the earliest arriving component.

Now, the earliest delay offset with signal energy is known and the integration time iM that maximizes its energy-to-noise ratio is known. This offset immediately yields an estimate for time-of-arrival, which may be the only desired parameter. However, additional parameters may now be extracted from the data. The smallest delay offset satisfying the channel parameter threshold criteria is generally referred to as the "prompt ray," i.e., the earliest arriving ray. The propagation delay of the "prompt ray" is typically the closest estimate to the distance between the mobile and the base station.

From the foregoing, the FFT peak value corresponding to the earliest delay yields an estimate of the complex channel gain for that signal component. The power spectrum and delay profile should be nearly identical on other antennas at the same site. Thus, using the same frequency component, delay offset and integration time iM, corresponding complex gains for the earliest component can be obtained from either adjacent sector antennas or additional phase array antennas. These gain values can be used to compute a direction-of-arrival estimate. A suitable method is described in commonly assigned U.S. patent application "METHOD AND APPARATUS FOR DETERMINING AN ANGLE OF ARRIVAL OF A TRANSMITTED SIGNAL IN A COMMUNICATION SYSTEM" by Golovin, et al., filed of even date herewith, the disclosure of which is hereby expressly incorporated herein by reference. As FIG. 2 indicates, a searcher assigned to the serving sector communicates these variables to searchers assigned to adjacent sector antennas.

It is possible that a channel impulse response is also desired. One motivation would be to apply interpolation and/or deconvolution in order to obtain a higher resolution estimate of mobile distance. To obtain a channel impulse response, the FFT values must be collected for a specific frequency over a range of delays and a chosen length iM. That is, a series of FFT's must be recomputed using the length that was determined to be optimal, and the outputs collected for the desired frequency. Because the despread waveforms have been retained for a search window spanning the impulse response, this should only require a small amount of additional computation.

Because a single frequency component is used for the described estimates, for a moving remote unit this will help isolate contributions from a single reflected path. This is because every reflection, depending on its position relative to the remote unit, will tend to produce distinct Doppler shift. The advantage is an improvement in performance when the complex gain values are used in direction-of-arrival algorithms. Moreover, the $E_i/N_i$ metrics, which estimate signal-to-noise ratio, may be directly used to measure confidence in a resulting location estimation.

The description of the invention, the specific details, and the drawings mentioned above, are not meant to limit the scope of the invention. For example, while the invention has been described in terms of estimating time-of-arrival for use in locating a remote unit, it may also be use to form other channel parameter estimates, such as, without limitation, signal-to-noise ratio and direction-of-arrival. It is the intent of the inventors that various modifications can be made to the invention without varying from the spirit and scope thereof, and it is intended that all such modifications come within the scope of the following claims and their equivalents.

We claim:

1. A method of estimating a channel parameter comprising the steps of:

obtaining a signal sample;

identifying from the signal sample a plurality of sample sub-groups;

for each of the sample sub-groups coherently averaging the sample sub-group over a plurality of sample lengths, a plurality of carrier frequency offsets and a plurality of delay offsets; and identifying a sample length, carrier frequency offset and delay offset that yields an optimal channel parameter for each sub-group.

2. The method of claim 1, wherein each sub-group represents a delay offset.

3. The method of claim 1, further comprising the step of selecting a sample sub-group for which the optimal channel parameter exceeds a predetermined threshold.

4. The method of claim 3, wherein the sample sub-groups correspond to delay offsets, and wherein the optimal channel parameter comprises an earliest delay offset.

5. The method of claim 1, further comprising the step of discarding sub-groups for which at least one sample length of the plurality of sample lengths fails to yield a channel parameter that exceeds a threshold value.

6. The method of claim 1, wherein the step of coherently averaging comprises computing a Fast Fourier Transform.

7. The method of claim 1, wherein the optimal channel parameter therefore comprises one of a peak energy value and a peak energy-to-noise ratio.

8. The method of claim 1, further comprising the step of estimating a time of arrival.

9. The method of claim 1, further comprising the step of determining a channel impulse response.

10. A method of estimating radio channel parameters comprising the steps of: obtaining a sample of a radio signal;

identifying a delay offset, carrier offset frequency, and coherent averaging length from the plurality of possible delay offsets, offset frequencies, and averaging lengths that yields an optimal sample energy metric for a channel propagation path of interest; and using the identified optimal delay offset, carrier frequency offset, and coherent averaging length to estimate various channel parameters for a channel propagation path of interest on one or more co-located antennas.

11. The method of claim 10, further comprising the steps of:

sub-grouping the signal into a plurality of overlapping sub-groups, with each sub-group characterized by a unique delay offset;

point-by-point multiplying each sub-group with a reference waveform;

decimating the resultant output for each sub-group to yield decimated outputs;

zero-padding the decimated outputs to yield zero-padded outputs; and transforming, using a fast discrete Fourier transform (FFT), the zero-padded output to produce FFT output spectra.

12. The method of claim 11, further comprising the steps of:

analyzing the FFT output spectra to compute corresponding energy metrics, wherein the step of analyzing comprises:

identifying peak energies in the region of the FFT output spectra that might contain signal components, averaging the noise energy in the region of the FFT spectra that will not contain signal components, computing the ratio between these peak and average energies, and retaining the position of the peak energies in the spectra to ascertain the carrier-frequency offset of the potential signal components.

13. The method of claim 12, further comprising the step of successively increasing the nonzero decimated waveform lengths used as inputs to the FFT's to generate an array of energy metrics for the plurality of sample sub-groups and a plurality of possible coherent averaging lengths.

14. The method of claim 13, further comprising the step of finding an optimal energy metric for a sample sub-group of interest, and mapping the optimal energy metric back to an optimal coherent averaging length, carrier frequency offset, and delay offset.

15. The method of claim 14, further comprising the step of discarding sample sub-groups for which none of the considered coherent averaging lengths yields a metric exceeding a threshold value after other sub-groups have yielded metrics exceeding the threshold.

16. An apparatus for estimating a channel metric in a communication system, the communication providing communication services to at least one remote unit operating within the communication system via radio frequency communication signals, the apparatus comprising:
   a receiver arranged to receive radio frequency communication signals from the remote unit and to provide as an output a baseband signal;
   a memory buffer coupled to the receiver and sized to store a sample of the baseband signal;
   a channel circuit coupled to the receiver, the channel circuit operable on the baseband signal to provide decoded information bits;
   a remodulator coupled the channel circuit, the remodulator operable on the information bits to form a reference baseband signal; and
   a searcher coupled to the memory buffer and the remodulator, the searcher adapted to coherently average the baseband signal and the reference baseband signal over a plurality delay offsets, a plurality of correlation lengths and a plurality of carrier frequency offsets, and to determine an optimal correlation length.

17. The apparatus of claim 16, wherein the memory buffer is sized to retain a sampled waveform between 0.1 second and 2.0 seconds in length.

18. The apparatus of claim 16, wherein the communication system comprises a code division multiple access communication system.

19. A computer program embodied on a computer-readable medium for estimating a channel metric in a communication system comprising:
   a first routine that obtains a signal sample and stores the signal samples in a buffer;
   a second routing that sub-groups the signal sample into a plurality of sample sub-groups;
   a third routine that, for each of the sample sub-groups, coherently averages the sample sub-group over a plurality of sample lengths, a plurality of carrier frequency offsets, and a plurality of delay offsets; and
   a fourth routine that, for each sample sub-group, identifies a sample length, carrier frequency offset, and delay offset that yields an optimal channel parameter for that sample sub-group.

20. The computer program of claim 19, wherein the second routine sub-groups the signal sample based upon delay offsets.

21. The computer program of claim 19, wherein the fourth routine identifies a sample sub-group having an earliest offset delay and a minimum energy value.

22. The computer program of claim 19, wherein the fourth routine identifies a sample sub-group having one of a peak energy value and a maximum energy-to-noise value.

23. The computer program of claim 19 implemented in a code division multiple access communication system.

24. The computer program of claim 19 further comprising a fifth routine that estimates a time of arrival of a delay offset.

25. The computer program of claim 19 further comprising a fifth routine that estimates a channel impulse response.

26. The computer program of claim 19, wherein the computer program is implemented in at least one computer readable media consisting of software on magnetic media, software on optical media, firmware, a programmable gate array and an application specific integrated circuit.

* * * * *